(12) United States Patent
Furukawa

(10) Patent No.: US 8,395,723 B2
(45) Date of Patent: Mar. 12, 2013

(54) LIQUID CRYSTAL DISPLAY WITH SHEET DEADWEIGHT AND TELEVISION APPARATUS

(75) Inventor: Norimasa Furukawa, Tokyo (JP)

(73) Assignee: Sony Corporation (JP)

( * ) Notice: Subject to any disclaimer, the term of this patent is extended or adjusted under 35 U.S.C. 154(b) by 758 days.

(21) Appl. No.: 12/148,723

(22) Filed: Apr. 22, 2008

(65) Prior Publication Data

US 2008/0266487 A1 Oct. 30, 2008

(30) Foreign Application Priority Data

Apr. 27, 2007 (JP) ................. P2007-119023

(51) Int. Cl.
*G02F 1/1335* (2006.01)
(52) U.S. Cl. ............... 349/61; 349/62; 349/63; 349/64; 349/65; 349/70; 349/117; 349/118; 349/119; 349/120; 349/121
(58) Field of Classification Search ............. 349/58, 349/70, 62–64, 105, 117–121
See application file for complete search history.

(56) References Cited

U.S. PATENT DOCUMENTS

| 7,159,999 B2 * | 1/2007 | Yoo et al. ............ 362/249.01 |
| 7,277,079 B2 * | 10/2007 | Kobayashi et al. ....... 345/102 |
| 7,573,447 B2 * | 8/2009 | Oh et al. ................. 345/87 |
| 2006/0204676 A1 | 9/2006 | Jones et al. |
| 2007/0008450 A1 | 1/2007 | Ueda |
| 2010/0079699 A1 * | 4/2010 | Cho et al. ............... 349/61 |

FOREIGN PATENT DOCUMENTS

| JP | 2004-021147 A | 1/2004 |
| JP | 2005-242270 | 9/2005 |
| JP | 2005-258403 A | 9/2005 |
| JP | 2006-294356 A | 10/2006 |
| JP | 2007-017737 A | 1/2007 |

OTHER PUBLICATIONS

Communication from corresponding EP Application No. 08154956, dated Mar. 1, 2010.
European Search Report, 08 15 4956, Jul. 28, 2008.

* cited by examiner

*Primary Examiner* — Hoan C Nguyen
(74) *Attorney, Agent, or Firm* — Lerner, David, Littenberg, Krumholz & Mentlik, LLP

(57) ABSTRACT

A display device includes: a panel; a light source provided on a surface disposed with facing at an interval of a predetermined distance from the back of the panel of said panel; and at least one optical sheet placed in front of said light source; wherein said optical sheet is placed with predetermined inclination angle to the above back of the panel so that it becomes closer from the top end to the bottom end of the back of the panel of said panel.

10 Claims, 7 Drawing Sheets

| INCH | 40 | 42 | 46 | 52 | 57 | 70 | 82 |
|---|---|---|---|---|---|---|---|
| DIAGONAL [cm] | 101.6 | 106.68 | 116.84 | 132.08 | 144.78 | 177.8 | 208.28 |
| HORIZONTAL [cm] | 88.55207457 | 92.9796783 | 101.8348858 | 115.1176969 | 126.1867063 | 154.9661305 | 181.5317529 |
| VERTICAL [cm] | 49.81054195 | 52.30106904 | 57.28212324 | 64.75370453 | 70.98002227 | 87.16844841 | 102.111611 |
| AREA [cm²] | 4410.826825 | 4862.936574 | 5833.318476 | 7454.297334 | 8956.735221 | 13508.15715 | 18536.49973 |
| INCLINATION ANGLE θ [°] | 0.10004523 | 0.0953106683 | 0.0870066593 | 0.077062746 | 0.0703326187 | 0.057297419 | 0.048926949 |
| 42 BASE (AREA) | 0.907029478 | 1 | 1.195546485 | 1.532879819 | 1.841836735 | 2.777777778 | 3.811791383 |
| SHEET DEAD LOAD [g] | 544.2176871 | 600 | 719.7278912 | 919.7278912 | 1105.102041 | 1666.666667 | 2287.07483 |
| PUSH LOAD [g] | 54.35560289 | 57.09986769 | 62.58511311 | 70.80662568 | 77.65356645 | 95.44345557 | 111.8549546 |
| PRESSURE [gk/m²] | 0.1232322231 | 0.1174184920 | 0.107289039 | 0.0949876659 | 0.0866985170 | 0.0706561630 | 0.0603430830 |

FIG. 5

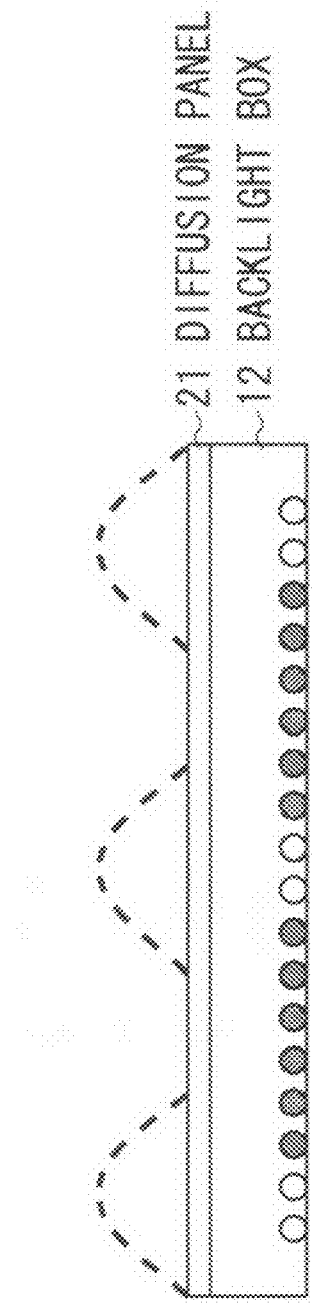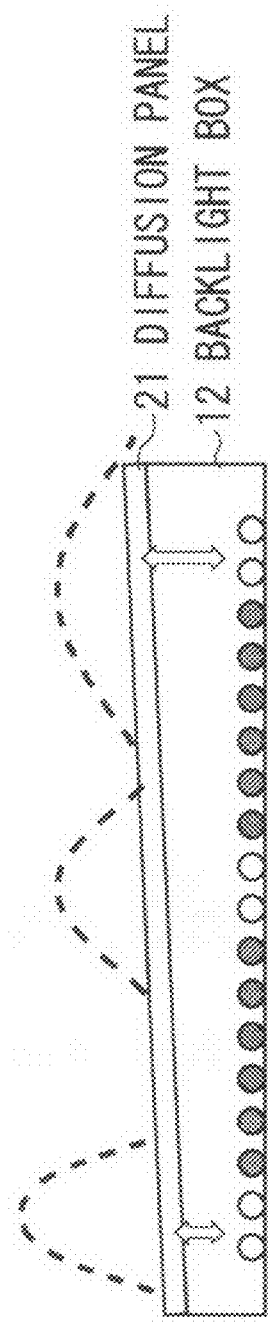
FIG. 6A
FIG. 6B

LIQUID CRYSTAL DISPLAY WITH SHEET DEADWEIGHT AND TELEVISION APPARATUS

CROSS-REFERENCE TO RELATED APPLICATIONS

The present application claims priority from Japanese Patent Application No. JP 2007-119023, filed in the Japanese Patent Office on Apr. 27, 2007, the entire content of which is incorporated herein by reference.

BACKGROUND OF THE INVENTION

1. Field of the Invention

The present invention relates to a liquid crystal display and a television apparatus, and is suitably applied.

2. Description of the Related Art

Liquid crystal displays have such configuration that a diffusion panel and an optical sheet are disposed in front of a backlight source facing to the back of the panel of a liquid crystal panel (see Jpn. Pat. Appln. Laid-Open Publication No. 2004-21147, for example).

SUMMARY OF THE INVENTION

In such liquid crystal display, on optical characteristics such as optical hue and tone, it is desired to keep a distance between a diffusion panel and an optical sheet constant. However, there is a case where the distance to the diffusion panel varies by that the optical sheet wrinkles by floating and sinking in a direction orthogonal to the surface direction of the sheet surface, owing to a change in environment such as temperature and humidity.

In this case, the optical characteristics change according to variations in a distance to the diffusion panel, and brightness on a display screen becomes uneven. As a result, there has been a problem that picture quality deteriorates.

The present invention has been done considering the above points and is proposing a liquid crystal display and a television apparatus in that a wrinkle in an optical sheet can be readily prevented.

To obviate such problems according to the present invention, a liquid crystal display has a liquid crystal panel, a light source provided on a surface disposed with facing at an interval of a predetermined distance from the back of the panel of the liquid crystal panel, and an optical sheet hanged in front of the light source. The above optical sheet is inclined at an inclination angle according to the sheet dead load of the optical sheet to the above back of the panel so as to be closer from the top end to the bottom end of the back of the panel of the liquid crystal panel.

Further, according to the present invention, a television apparatus has a liquid crystal panel, a light source provided on a surface disposed with facing at an interval of a predetermined distance from the back of the panel of the liquid crystal panel, an optical sheet hanged in front of the light source, and drive means for driving the light source and the liquid crystal panel. The above optical sheet is inclined at an inclination angle according to the sheet dead load of the optical sheet to the above back of the panel so as to be closer from the top end to the bottom end of the back of the panel of the liquid crystal panel.

According to the present invention as described above, by inclining an optical sheet to be hanged, a movement in the direction orthogonal to the surface direction of the sheet surface can be constrained by the sheet dead load of the above optical sheet. Thus, a liquid crystal display and a television apparatus in that a wrinkle in an optical sheet can be readily prevented can be realized.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 5 shows a schematic diagram showing the relationship between a sheet dead load and an inclination angle;

FIG. 6 shows a schematic diagram for explaining a change of the brightness state by inclination.

DETAILED DESCRIPTION OF THE PREFERRED EMBODIMENTS

An embodiment of the present invention will be described in detail with reference to the accompanying drawings.

(1) Configuration of Television Apparatus According to this Embodiment

Figure 1:
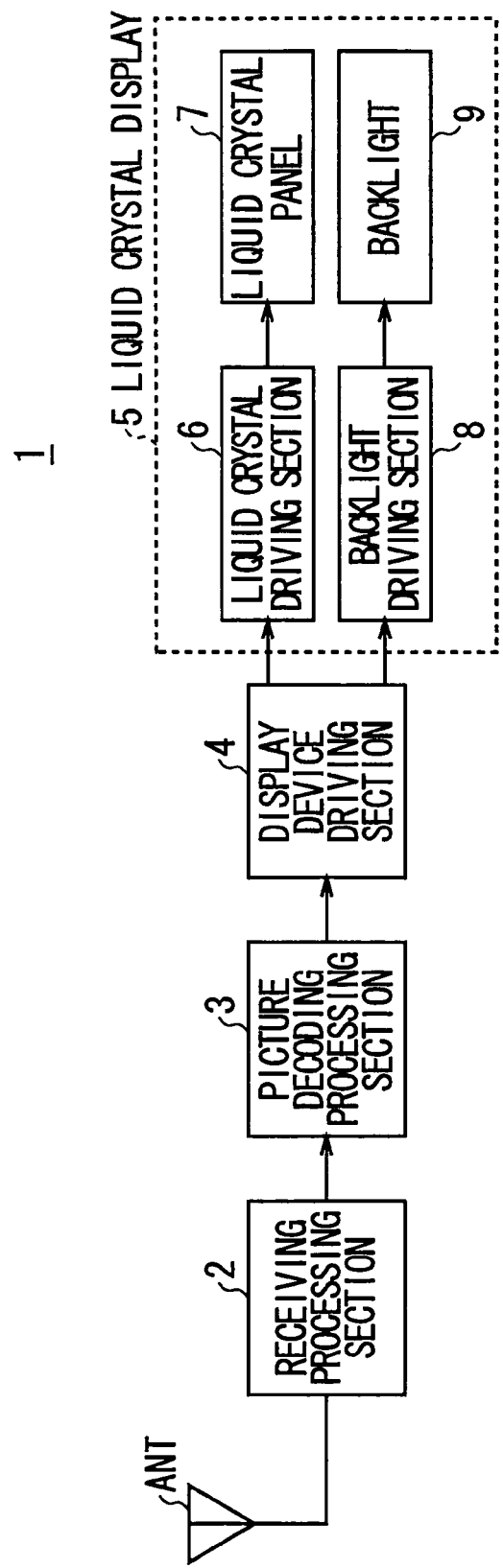
FIG. 1 shows a block diagram showing the configuration of a television apparatus.

Referring to FIG. 1, the configuration of a television apparatus 1 according to this embodiment is shown. The television apparatus 1 has the configuration that includes a receiving processing section 2, a picture decoding processing section 3, a display device driving section 4 and a liquid crystal display 5. The liquid crystal display 5 is formed by a liquid crystal driving section 6, a liquid crystal panel 7, a backlight driving section 8 and a backlight 9.

The receiving processing section 2 performs predetermined demodulation processing or the like on a digital television broadcast signal received via an antenna ANT, extracts coded data that was coded by a predetermined compressive coding method such as the MPEG (Motion Picture Expert Group), and supplies this to the picture decoding processing section 3.

The picture decoding processing section 3 performs decoding processing or the like on the coded data by a method coping with the coded data, and transmits video data generated as a result of the above processing to the display device driving section 4.

The display device driving section 4 generates a driving signal concerning a drive of the liquid crystal display 5 from the video data by signal processing such as chroma processing and separate signal generating processing, and transmits this to the liquid crystal driving section 6. By the liquid crystal driving section 6, an image based on the driving signal is sequentially displayed on the display screen of the liquid crystal panel 7. On the other hand, the display device driving section 4 generates a driving signal to make the light sources of the backlight 9 provided corresponding to a plurality of divided areas in the liquid crystal panel 7 individually light, and transmits this to the backlight driving section 8. By the backlight driving section 8, the light source of the backlight 9 is lighted in a lightning pattern based on the driving signal.

In this manner, in the television apparatus 1, the images of a television broadcasting program broadcasted by ground digital broadcasting and BS (Broadcast Satellite) digital broadcasting can be displayed.

In the television apparatus 1 according to this embodiment, the display device driving section 4 adjusts the lightning state of the light source and the brightness state of an image to be displayed so that the contrast of the image displayed on the liquid crystal display 5 becomes clear, as well as saving the power consumption of the backlight in the liquid crystal display 5.

Concretely, the display device driving section 4 detects a brightness level in the image based on the driving signal (the image to be displayed) in a block unit in a predetermined size. In these blocks, for example, if there is a block in that the level of a brightness distribution is above a first threshold value and the level difference of the brightness distribution is below a second threshold value, the display device driving section 4 executes lightning processing such as making the light sources corresponding to the above block to partly light.

Furthermore, the display device driving section 4 maintains a light diffusion pattern corresponding to a lightning pattern for the plurality of light sources in an internal storage medium as data. In the case of making the light sources to partly light, the display device driving section 4 corrects a brightness level in the image to be displayed in the opposite pattern to the light diffusion pattern corresponding to that lightning pattern, so that dynamic range for the image to be displayed is extended.

In the display device driving section 4, for example, in the image to be displayed, if there is a flat part having brightness above a certain level, only the light sources corresponding to the flat part are partly lighted, so that uneven light diffusion pattern by the above partly lightning is canceled by a brightness pattern corrected as the opposite pattern to the diffusion pattern. As a result, contrast is emphasized as well as restraining uneven brightness in the whole display screen.

In this manner, the display device driving section 4 adjusts the degree of lightning by making only the light sources corresponding to the part to partly light, based on divided brightness parts in an image to be displayed, and also corrects brightness in the image to be displayed to the opposite pattern to the diffusion pattern corresponding to the above lightning pattern. Thereby, a contrast in the image to be displayed on the liquid crystal panel 7 can be clear, as well as saving the power consumption of the backlight 9.

(2) Configuration of Liquid Crystal Display

Figure 2:
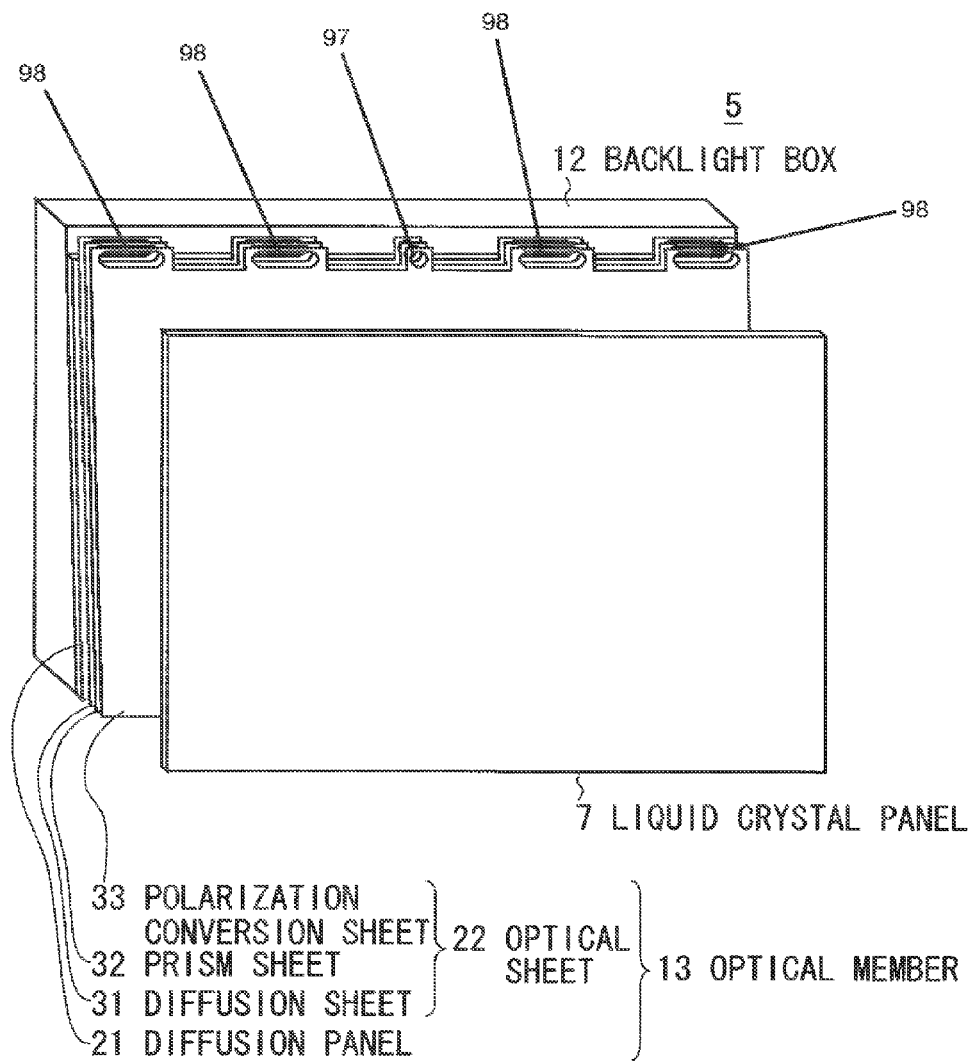
FIG. 2 shows a schematic diagram showing the configuration of a liquid crystal display.

Next, the configuration of the liquid crystal display 5 will be described. As shown in FIG. 2, the liquid crystal display 5 has the configuration that includes the liquid crystal panel 7, a backlight box 12 and an optical member 13.

The backlight box 12 is disposed in the state where the bottom surface faces to the back of the panel of the liquid crystal panel 7 at an interval of a predetermined distance from the liquid crystal panel 7. On the above bottom surface, a plurality of light sources (not shown (corresponding to the backlight 9)) formed by for example cool cathode fluorescent lamps or LEDs (Light Emitting Diodes) or the like are arranged.

Further, on the opening surface of the backlight box 12, a diffusion panel 21 having an optical characteristic that diffuses an incidental light so that brightness becomes even is fixed. In a frame part being the top side of the above opening surface, a plurality of hanging hooks (not shown) for hanging an optical sheet 22 are provided at predetermined intervals.

The optical sheet 22 is formed by a diffusion sheet 31, a prism sheet 32 and a polarization conversion sheet 33, in this embodiment.

The diffusion sheet 31 has an optical characteristic that improves front brightness by the multiplied effects when in combined with the prism sheet 32 and the polarization conversion sheet 33. The prism sheet 32 has an optical characteristic that condenses to the front. The polarization conversion sheet 33 has an optical characteristic that controls a light polarizing direction.

In these diffusion sheet 31, the prism sheet 32 and the polarization conversion sheet 33, a plurality of hook inserting holes are formed at a part being the respective top end of the above sheets at predetermined intervals. Each of the diffusion sheet 31, the prism sheet 32 and the polarization conversion sheet 33 is hanged by a corresponding hanging hook provided on the top end frame of the backlight box 12 via the hook inserting hole. Thereby, they are disposed in the order of the diffusion sheet 31, the prism sheet 32 and the polarization conversion sheet 33 in front of the diffusion panel 21.

In the hook inserting holes, there are a first hook inserting hole that fits an inserted hanging hook, and a second hook inserting hole capable of permitting movement for the above first hook inserting hole in the horizontal direction to the hanging hook. The second hook inserting hole is provided based on the first hook inserting hole. In this embodiment, for example, as shown in FIG. 2, one circular first hook inserting hole 97 is provided at the center of the top end of the sheet, and a plurality of second hook inserting holes 98 having an oval shape by that the circle shape was expanded into the horizontal direction are provided on the right and left sides of the above first hook inserting hole at predetermined intervals.

Thereby, in the liquid crystal display 5, the stretch of the diffusion sheet 31, the prism sheet 32 and the polarization conversion sheet 33 can be flexible against environment change such as temperature change and humidity change. As a result, such that the sheet does not return persistently to the original state from the stretched state can be prevented.

In this manner, the liquid crystal display 5 has a configuration that the diffusion panel 21 is disposed in front of a plurality of light sources arranged on the back of the panel of the liquid crystal panel 7 at a predetermined distance, and the optical sheet 22 is disposed in front of the above diffusion panel 21 in the order of the diffusion sheet 31, the prism sheet 32 and the polarization conversion sheet 33.

In addition to this, the liquid crystal display 5 has a configuration that the respective surface of the optical member 13 (the diffusion panel 21, the diffusion sheet 31, the prism sheet 32 and the polarization conversion sheet 33) are inclined to the panel surface of the liquid crystal panel 7.

Figure 3:
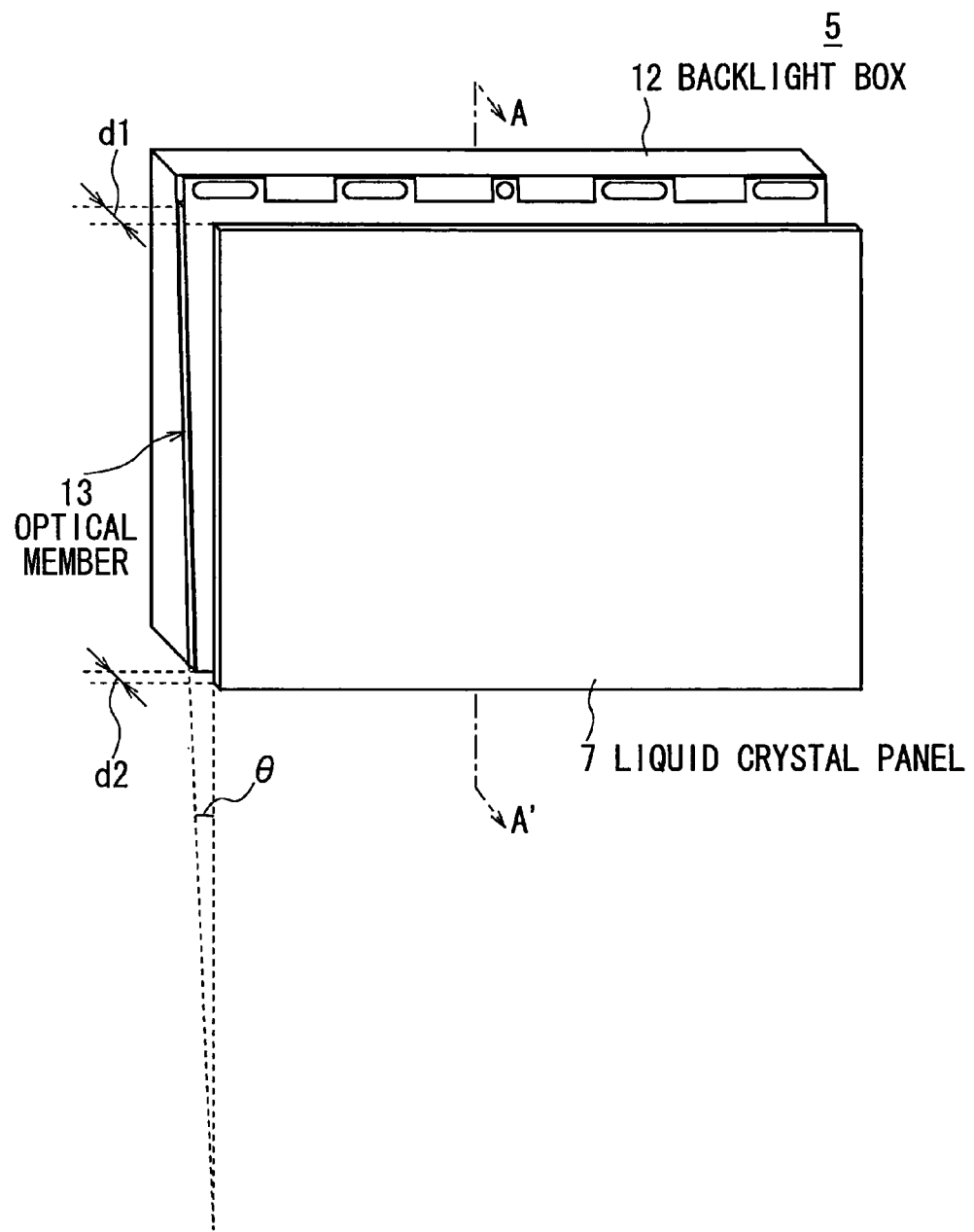
FIG. 3 shows a schematic diagram showing the inclined structure of the liquid crystal display (1)
Figure 4:
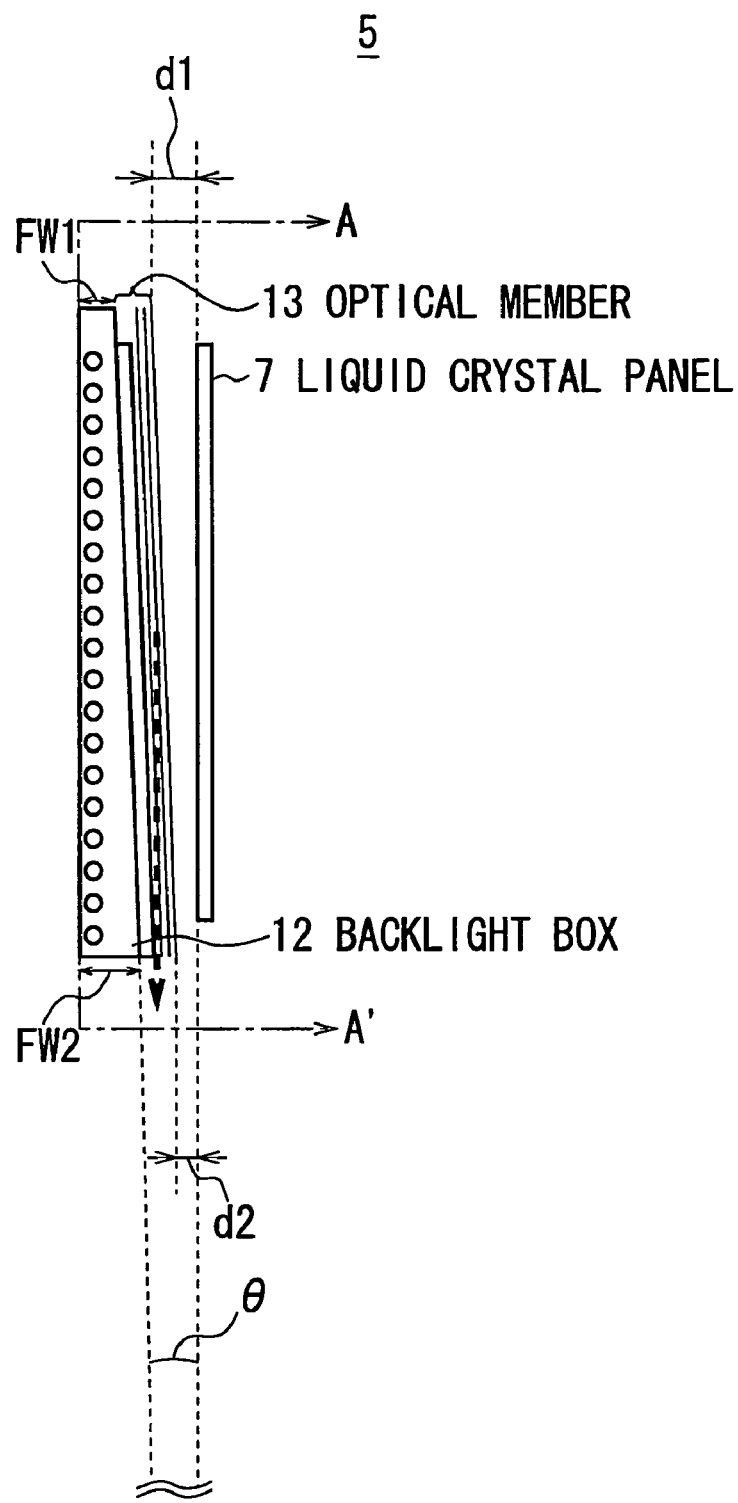
FIG. 4 shows a schematic diagram showing the inclined structure of the liquid crystal display (2)

Concretely, in the case of this embodiment, as shown in FIG. 3 and FIG. 4 by taking a section A-A' in this FIG. 3, a frame length FW2 of the bottom end frame is formed larger than a frame length FW1 of the top end in the backlight box 12. Thereby, the opening surface of the backlight box 12 is inclined to the back of the panel of the liquid crystal panel 7 at a predetermined inclination angle θ.

Therefore, the diffusion panel 21 fixed to the opening surface of the backlight box 12 and the optical sheets 22 hanged from the top end frame of the above opening surface are respectively inclined to the back of the panel of the liquid crystal panel 7 at the predetermined inclination angle θ.

As a result, in the liquid crystal display 5, a push load according to the sheet dead load of the optical sheet 22 (a part shown by a bold broken line in FIG. 4) is added in the vertical direction. By the above load, adhesiveness between the diffusion panel 21 and the diffusion sheet 31, the diffusion sheet 31 and the prism sheet 32, and the prism sheet 32 and the polarization conversion sheet 33 becomes improved respectively.

In this connection, the liquid crystal panel 7 and the backlight box 12 are disposed with facing so that a direct distance d2 between the top end of the back of the panel of the liquid crystal panel 7 and the front surface of the sheet of the polarization conversion sheet 33 becomes larger than a direct distance d1 to the bottom end, on a basis of a distance to be secured on the optical characteristics.

In this manner, the liquid crystal display 5 has a configuration that the diffusion panel 21 and the optical sheets 22 hanged on the above diffusion panel 21 (the diffusion sheet 31, the prism sheet 32 and the polarization conversion sheet 33) are inclined so as to become closer from the top end to the bottom end of the back of the panel of the liquid crystal panel 7. Thereby, each adhesiveness between the diffusion panel 21 and the diffusion sheet 31, the diffusion sheet 31 and the prism sheet 32, and the prism sheet 32 and the polarization conversion sheet 33 can be maintained by the sheet dead load of the above optical sheet 22.

Further, in the liquid crystal display 5, a movement (stretch) in the surface direction can be permitted, as well as restraining a movement (floating and sinking) in the direction orthogonal to the surface direction of the sheet surface in the optical sheet 22 (that is, keeping the adhesiveness of each sheet to the diffusion panel).

The above inclination angle θ is selected according to the sheet dead load of the optical sheet 22 (the diffusion sheet 31, the prism sheet 32 and the polarization conversion sheet 33) to be hanged. The sheet dead load of the optical sheet 22 may be considered the weight of such optical sheet. Here, the relationship between the inclination angle θ and the sheet dead load is shown in FIG. 5.

In this FIG. 5, in the optical sheet 22 in each screen size in a certain product, as to the sheet dead load of the optical sheet 22 in 42 inch, a measured value (approximately 600 g) is adopted. As to the sheet dead load of an optical sheet in other screen size, a value which was obtained according to the area ratio of the optical sheet in 42 inch is adopted.

Further, in this FIG. 5, a push load of an optical sheet in each screen size is a multiplication result of the sheet dead load of the above optical sheet by the sine component of an inclination angle θ according to the sheet dead load (sin θ) is adopted. Accordingly, the push load of the optical sheet may be a component of the sheet dead load which is perpendicular to a surface of the optical sheet.

As is obvious also from this FIG. 5, as the sheet dead load is larger, the inclination angle is selected to a smaller value. Thereby, a practical value can be obtained as a load in such degree that a movement (floating and sinking) in the direction orthogonal to the sheet surface is restrained (that is, the adhesiveness of each sheet to a diffusion panel is kept) as well as permitting a movement (stretch) in a sheet surface direction in the optical sheet 22.

(3) Relationship Between Inclination of Optical Sheet 22 and Correction in Display Device Driving Section 4

By the way, in the case where the diffusion panel 21 is not inclined, as shown in FIG. 6(A), a distance between the light sources provided on the bottom surface of the backlight box 12 and the diffusion panel 21 provided on the opening surface of the above backlight box 12 is constant at any positions. Thus, the light diffusion patterns become almost the same.

On the contrary, in this embodiment, the diffusion panel 21 is inclined. Therefore, as shown in FIG. 6(B), a distance between the light sources provided on the bottom surface of the backlight box 12 and the diffusion panel 21 provided on the opening surface of the above backlight box 12 becomes larger from the upper column to the lower column in the front surface of the diffusion panel 21. Thus, as it goes from the upper column to the lower column in the front surface of the diffusion panel 21, the spread of distribution in a light diffusion pattern becomes larger.

Therefore, in the case where when facing light sources were lighted according to the brightness of an image corresponding to the divided light sources, the display device driving section 4 corrects a brightness level in an image to be displayed to a pattern opposite to a light diffusion pattern corresponding to the lighting pattern, if the brightness level is not corrected to the pattern opposite to the diffusion pattern in that a change due to the inclination of the optical sheets 22 is reflected, it becomes the relationship that unevenness in the above light diffusion pattern by partly lighted is not canceled by the brightness pattern that was corrected as the pattern opposite to the diffusion pattern. As a result, it can cause a result that unevenness in brightness on the display screen is contrary emphasized.

Then, on the basis of a distance to the light source that is considered to be optimum on the optical characteristics in the diffusion panel 21, as a flat part having brightness above a certain level is at a lower part of the image, the spread of the distribution in the light diffusion pattern corresponding to a lightning pattern for the plurality of light sources that is maintained in a storage medium in the display device driving section 4 according to this embodiment as data is set larger.

Thereby, even in the case where the diffusion panel 21 is inclined, the display device driving section 4 can make contrast clear, as well as suitably restraining the unevenness in brightness in the entire display screen.

(4) Operation and Effect

According to the above configuration, this liquid crystal display 5 in the television apparatus 1 has a structure in that the diffusion panel 21, the optical sheets 22 hanged on the above diffusion panel 21 (the diffusion sheet 31, the prism sheet 32 and the polarization conversion sheet 33) are inclined so as to close from the top end to the bottom end of the back of the panel of the liquid crystal panel 7.

Thereby, in the liquid crystal display 5, by the sheet dead load of the optical sheet 22, a movement (floating and sinking) in the direction orthogonal to the optical sheet 22 can be restrained (that is, respective adhesiveness between the diffusion panel 21 and the diffusion sheet 31, the diffusion sheet 31 and the prism sheet 32, and the prism sheet 32 and the polarization conversion sheet 33 can be kept), while permitting a movement (stretch) in the sheet surface direction in the above optical sheet 22.

As the above inclination angle, as the sheet dead load of the optical sheet 22 is larger, a smaller value is selected. Thereby, a movement (floating and sinking) in the direction orthogonal to the sheet surface can be suitably restrained, while permitting a movement (stretch) in the sheet surface direction.

Further, in the case of this embodiment, if a flat part having brightness above a certain level is detected in an image to be displayed, the display device driving section 4 for driving the liquid crystal display 5 makes light sources corresponding to the flat part to partly light, and also corrects brightness in the image to be displayed to the pattern opposite to the diffusion pattern corresponding to the above lighting pattern in the front surface of the diffusion panel 21 (the back of the optical sheet 22).

In this case, on the basis of a distance to the light source that is considered to be optimum on the optical characteristics in the diffusion panel 21, as a flat part having brightness above a certain level is at a lower part of the image, the spread of distribution in the above light diffusion pattern is set larger.

Thereby, even in the case where the diffusion panel 21 is inclined, the display device driving section 4 can make contrast clear, while suitably restraining the unevenness of brightness in the entire display screen.

According to the above configuration, it has a structure in that the diffusion panel 21 and the optical sheet 22 hanged on the above diffusion panel 21 are inclined as closer from the top end to the bottom end of the back of the panel of the liquid crystal panel 7. Thereby, adhesiveness in the above optical sheet 22 can be kept by the sheet dead load of the optical sheet 22. Thus, a television apparatus 1 in that a wrinkle in an optical sheet can be readily prevented can be realized.

(5) Other Embodiments

In the aforementioned embodiment, it has dealt with the case where as the optical sheet 22, the diffusion sheet 31, the prism sheet 32 and the polarization conversion sheet 33 are applied. However, the present invention is not only limited to this but also an optical sheet corresponding to the above diffusion panel 21 may be added in place of the diffusion panel 21, for example. Further, a number of members in the optical sheet 22 and the optical characteristics of the members can be properly changed according to optical design.

Moreover, in the aforementioned embodiment, it has dealt with the case where the optical sheet 22 is hanged on the diffusion panel 21 by passing the through holes formed in the above optical sheet 22 through a hanging hook. However, the present invention is not only limited to this but also various hanging techniques other than this, such as hanging it by pinching the top end part of the sheet, can be adopted. In this connection, in the aforementioned embodiment, the optical sheet 22 is hanged on the diffusion panel 21 from the backlight box 12. However, it may be hanged from other forming section.

Figure 7:
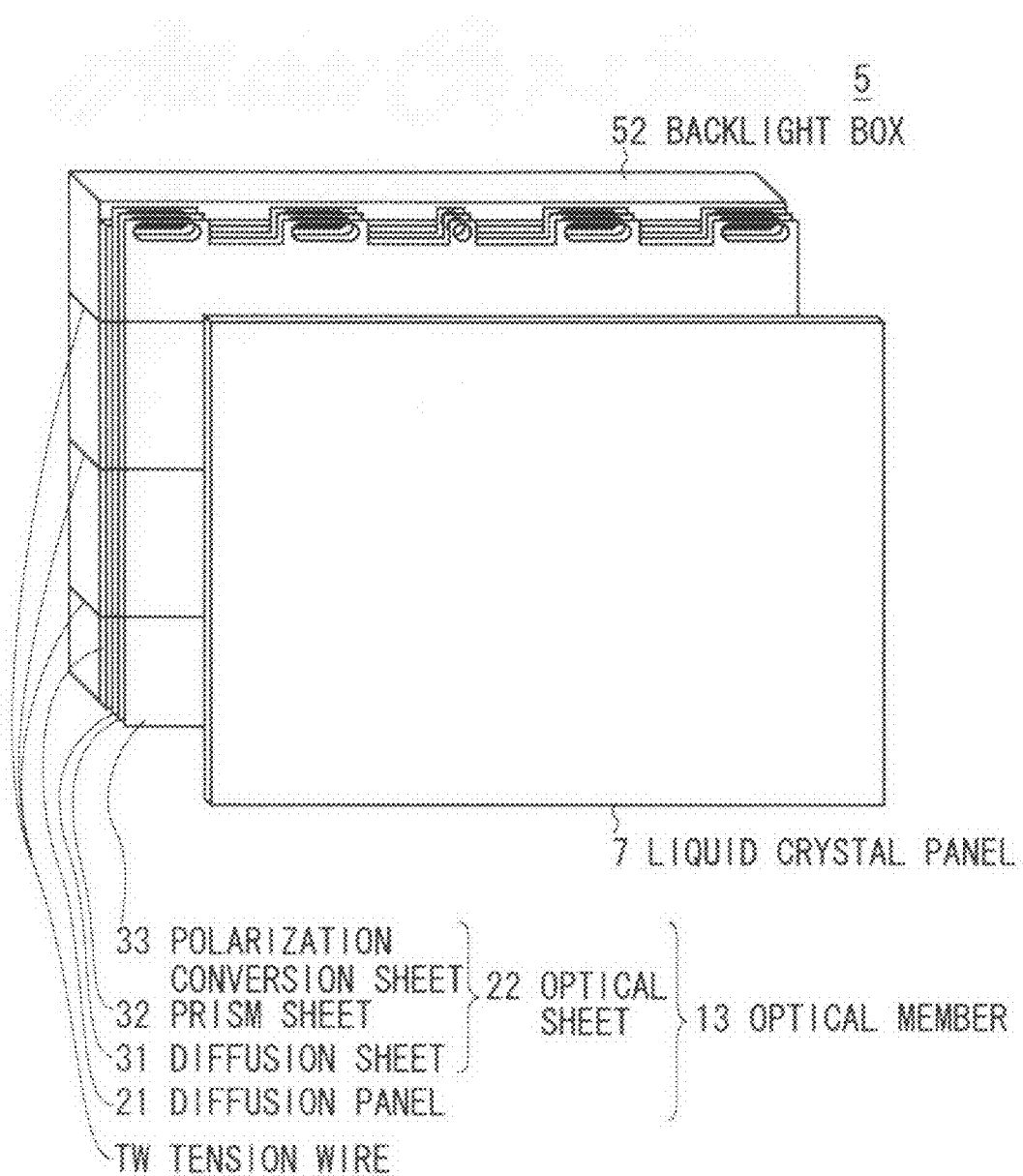
FIG. 7 shows a schematic diagram showing the holding form of an optical sheet according to other embodiment.

Further, in the aforementioned embodiment, it has dealt with the case where adhesiveness in the above optical sheet 22 is kept by the dead load of the optical sheet 22. However, the present invention is not only limited to this but also for example, as FIG. 7 in that same reference numerals are added to corresponding parts to FIG. 3, adhesiveness in the above optical sheet 22 may be kept by holding the optical sheet 22 to the diffusion panel 21 by a tension wire TW from the horizontal direction at predetermined intervals.

Moreover, in place of the tension wire TW, a transparent magnetic body may be magnetized to the diffusion panel 21 and the optical sheet 22, to keep adhesiveness in the above optical sheet 22 by the magnetic power of the magnetic body.

Further, in place of the tension wire TW, the diffusion panel 21 and the optical sheet 22 may be fixed with adhesive, to keep adhesiveness in the above optical sheet 22 by the adhering power of the above adhesive.

If applying this method, a backlight box 52 which has an opening surface parallel to the back of the panel of the liquid crystal panel 7 can be adopted, without inclining the opening surface by forming the frame length FW2 of the bottom end frame larger than the frame length FW1 of the top end in the backlight box 12 (FIG. 3) as the aforementioned embodiment.

The present invention is utilizable to the field concerning a liquid crystal display.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:
a panel;
a light source provided on a surface disposed with facing at an interval of a predetermined distance from the back of the panel of said panel; and
at least one optical sheet placed in front of said light source; wherein
said optical sheet is placed with a selected inclination angle to the above back of the panel so that it becomes closer from the top end to the bottom end of the back of the panel of said panel, and
said inclination angle being selected in accordance with a sheet deadweight of said optical sheet, in which said inclination angle decreases as the sheet deadweight increases.

2. The display device according to claim 1, wherein:
said panel is a liquid crystal panel having at least liquid crystal material;
said light source is provided on the bottom surface of a backlight box disposed with facing at an interval of a predetermined distance from the back of the panel of said liquid crystal panel; and
in said backlight box, the frame length of a bottom end frame is formed larger than that of a top end frame.

3. The display device according to claim 2, wherein:
said backlight box has a predetermined inclination to said liquid crystal panel; and
said optical sheet is placed with respect to the predetermined incline of said backlight box.

4. The display device according to claim 1, wherein said optical sheet consists of at least a polarization conversion sheet, a prism sheet, or a diffusion sheet.

5. The display device according to claim 1, wherein said optical sheet has at least a first hole and a second hole which is larger than the first hole.

6. A television apparatus comprising:
a liquid crystal panel;
a light source provided on a surface disposed with facing at an interval of a predetermined distance from the back of the panel of said liquid crystal panel; and
an optical sheet hanged in front of said light source; and
drive means for driving said light source and said liquid crystal panel; wherein
said optical sheet is inclined at a selected inclination angle to the above back of the panel so that it becomes closer from the top end to the bottom end of the back of the panel of said liquid crystal panel, and
said inclination angle being selected in accordance with a sheet deadweight of said optical sheet, in which said inclination angle decreases as the sheet deadweight increases.

7. The television apparatus according to claim 6, wherein said drive means subdivides an image to be displayed, and based on the brightness information of each subdivided area, lights a light source light with adjusting a lighting amount of a backlight source respectively corresponding to said each area, and also corrects said brightness information of said image to be displayed to an opposite pattern to a light diffusion pattern corresponding to the above lighting pattern.

8. A liquid crystal display comprising:

a liquid crystal panel;

a light source provided on a surface disposed with facing at an interval of a predetermined distance from the back of the panel of said liquid crystal panel; and an optical sheet hanged in front of said light source; and drive means for driving said light source and said liquid crystal panel; wherein said optical sheet is inclined at a selected inclination angle to the above back of the panel so that it becomes closer from the top end to the bottom end of the back of the panel of said liquid crystal panel, and said inclination angle being selected in accordance with a sheet deadweight of said optical sheet, in which said inclination angle decreases as the sheet deadweight increases.

9. A television apparatus comprising:

a liquid crystal panel;

a light source provided on a surface disposed with facing at an interval of a predetermined distance from the back of the panel of said liquid crystal panel; and an optical sheet hanged in front of said light source; and drive means for driving said light source and said liquid crystal panel; wherein said optical sheet is inclined at a selected inclination angle to the above back of the panel so that it becomes closer from the top end to the bottom end of the back of the panel of said liquid crystal panel, and said inclination angle being selected in accordance with a sheet deadweight of said optical sheet, in which said inclination angle decreases as the sheet deadweight increases.

10. The television apparatus according to claim 9, wherein said drive means, subdivides an image to be displayed, and based on the brightness information of each subdivided area, lights a light source light with adjusting a lighting amount of a backlight source respectively corresponding to said each area, and also corrects said brightness information of said image to be displayed to an opposite pattern to a light diffusion pattern corresponding to the above lighting pattern.

* * * * *